United States Patent [19]

Pazar et al.

[11] Patent Number: 4,578,897
[45] Date of Patent: Apr. 1, 1986

[54] PLANT WATERING AND/OR FEEDING UNIT FOR AUTOMATICALLY DISPENSING ITS PREFILLED VOLUME OF LIQUID, AS PERIODICALLY NEEDED, TO A CONTAINER BOUND PLANT

[76] Inventors: Robert A. Pazar, 868 S. 113th St., Tacoma, Wash. 98444; David B. Petrich, P.O. Box 518, Tacoma, Wash. 98401

[21] Appl. No.: 517,997

[22] Filed: Jul. 28, 1983

[51] Int. Cl.$^4$ ............................................. A01G 29/00
[52] U.S. Cl. ....................................... 47/48.5; 239/63
[58] Field of Search .................. 47/79, 48.5, 59, 82, 47/80, 81; 239/61, 63

[56] References Cited

U.S. PATENT DOCUMENTS

| 1,842,687 | 1/1932 | Reynolds | 137/453 |
| 2,519,166 | 8/1950 | White | 47/79 |
| 2,595,782 | 5/1952 | Epstein | 47/48.5 |
| 2,837,869 | 6/1958 | Chatten | 47/48.5 |
| 3,125,255 | 3/1964 | Kaiser | 222/189 |
| 3,438,575 | 4/1969 | Rohling | 239/1 |
| 3,754,352 | 8/1973 | Bates | 47/48.5 |
| 3,856,205 | 12/1974 | Rohling | 239/63 |
| 4,148,155 | 4/1979 | Allen | 47/59 |
| 4,223,837 | 9/1980 | Gubbiotti | 239/50 |

FOREIGN PATENT DOCUMENTS

| 1757347 | 6/1971 | Fed. Rep. of Germany | 47/79 |
| 2396502 | 3/1979 | France | 47/79 |

Primary Examiner—Robert A. Hafer
Assistant Examiner—Danton DeMille
Attorney, Agent, or Firm—Roy E. Mattern, Jr.

[57] ABSTRACT

A plant watering and/or feeding unit automatically and periodically dispenses water as needed. As assembled, an air tube extends essentially throughout the central length of a selected plastic bottle and beyond the otherwise sealed cap entry of this plastic bottle for insertion of the extending, first heat sealed then partially cut opened, air tube end, down through the soil without being blocked by any entering soil, to contact the bottom of the earth filled plant container. A liquid orifice is located in the plastic bottle in its shoulder about midway between the entry and the side of the bottle.

During plant watering and/or feeding cycles, liquid drips from the liquid orifice in the shoulder, until the water table in the soil, i.e. the liquid level in the soil, rises above the end of the partially opened air tube to seal off the entry of air. Then the dripping of liquid stops, until this liquid level goes below the end of the partially opened air tube. With the liquid seal broken once again the vacuum volume above the liquid level in the bottle becomes a pressure air volume, and liquid drips out the orifice and into the soil. This cycle continues until the prefilled volume of watering and/or feeding liquid is depleted.

1 Claim, 10 Drawing Figures

PLANT WATERING AND/OR FEEDING UNIT FOR AUTOMATICALLY DISPENSING ITS PREFILLED VOLUME OF LIQUID, AS PERIODICALLY NEEDED, TO A CONTAINER BOUND PLANT

BACKGROUND OF THE INVENTION

There have been many prior inventions concerning the better watering and/or feeding of plants in containers and also for the watering of cut flowers in a vase even for their limited times of enjoyment. By way of example, in 1932, Charles E. Reynolds in his U.S. Pat. No. 1,842,687, described how he automatically dispensed water from a container which was placed in a vase among cut flowers. The principle he utilized was: water will not flow from an airtight receptacle unless air is admitted thereto, then when a level of water in a vase or pot, ot other container drops to the bottom of an air tube depending from the receptacle, air is permitted to pass up into the receptacle, and water or other liquid is discharged from the tube or from other means, until the level of the water in the container raises again to cover the bottom of the air tube, thereby shutting off the flow of air and water and/or other liquid.

Also in 1969, Hermann Rohling in his U.S. Pat. No. 3,438,575 described his root controlled watering device utilizing this same principle in several other embodiments of apparatus, some of which were connected to irrigation supply systems to replenish the water tanks, i.e. the receptacle. In 1973, Gary G. Bates, in his U.S. Pat. No. 3,754,352, presented his device, for watering trees and plants, which delivered water to root locations, when the roots were soon to be dry, utilizing this same principle, wherein water was held in a receptacle until the water seal below ground level was broken, allowing air to reach the space above the water in the receptacle and eliminate the vacuum.

In 1974, Hermann Rohling presented another of his watering devices in his U.S. Pat. No. 3,856,205 centering his attention on the proper watering of potted plants using small size apparatus having no moving parts. Again he used the same principle. Over a period of time, the water evaporated from the soil and/or was absorbed by the roots of the plant. Thus the water level in the pot lowered below the bottom opened end of a tube, thereby allowing air to flow through the soil and into the tuve and subsequently into the container, i.e. receptacle. Thereby the vacuum was relieved, causing water to flow again, until a subsequent equilibrum was reached. Although Mr. Rohling's apparatus was small and had no moving parts, many especially formed components were assembled to complete the watering device.

In 1979, Donavan J. Allen in his U.S. Pat. No. 4,148,155, disclosed his system for automatically feeding plants, wherein he also utilized the same principle, wherein water and/or a plant food nutrient flows out of a receptacle, until the sufficient quantity of such liquid in the soil, seals off the bottom vent opening, i.e. bottom of an inserted tube. Mr. Donavan used bottles as his reservoirs or receptacles.

Although these prior inventions successfully utilized this principle to water plants on the demand of the lack of water in the locale of the roots, presently it is believed there is no widespread use of such inventions utilizing this principle. Those offered previously, for example, may have unwantedly had their below soil vents easily clogged by soil, which entered excessively and/or compactedly when their vented portions were inserted into the soil or moved around in the soil.

SUMMARY OF THE INVENTION

A plant watering and/or feeding unit for automatically dispensing its prefilled volume of liquid, as periodically needed, to a container bound plant, will be available at comparatively low cost and to be optionally sold with plant feeding liquid sealed within its interior of the assembled conventional, standard, available, low cost, bottle, tube, and cap components. By using the principle discussed in the background, also referred to as the vacuum pressure release principle, a growing plant only receives water and/or liquid nutrient when the plant needs it. When the water table in the soil, i.e. the liquid level in the soil, at or near the bottom of the flower pot or other container or a container set, i.e. a dish and pot, drops below the vent at the inserted end of the sensor tube, the water seal is then eliminated, and air passes through the soil and into the sensor tube, and beyond up and into the conventional plastic bottle to eliminate the vacuum. Then again the flow of the watering and/or feeding liquid begins from the bottle through an orifice, centrally located in the shoulder of the bottle, i.e. midway between the entry of the bottle and the wall of the bottle. When the liquid level in the flower pot rises above the vent in the sensor tube, the water seal stops the passage of air, the vacuum is again created, and the liquid is held in the bottle, by the vacuum negative pressure, until the cycle is repeated.

In embodiments of this plant watering and/or feeding unit, conventional plastic bottles of three sizes are now selected: an eight ounce bottle, ten inches in height; a sixteen ounce bottle, thirteen inches in height; and a thirty-two ounce bottle, seventeen inches in height. The plastic sensing tubes of respective lengths being about twice the heights of the respective bottles are derived from conventional plastic tubing having a one-half inch inside diameter and a five-eighths inch outside diameter. In place, the open ends of the sensor tubes also contact the bottom of the bottles being approximately one-sixteenth of an inch away, and the bias cut originally heat sealed ends of the sensor tubes contact the bottom of the flower pot. Otherwise conventional bottle caps are made with holes to accommodate the sensor tubes. The sealing between the sensor tube, cap and entry of the bottle centers on the use of a sealing ring and/or a heat formed exterior circular embossment on the sensor tube.

The plant owners or others caring for them may purchase and use this very low cost plant watering and/or feeding unit to keep their plants properly watered without daily attention. Only must the bottles of the units be refilled at selected intervals. Short vacations are possible without the help of others to care for plants. During longer vacations the stop ins of those helping may be less frequent, and always the actual watering remains on a when needed schedule.

After the placement of bottles filled with liquid above the soil with their sensor tubes inserted downwardly directly into soil or into a positioning and supporting tube pre positioned in the soil, subsequently either cutting the heat sealed end on a bias of the sensor tube to create the vent, or removing a sealed vent cover, and then removing a sealed vent cover over the orifice in the shoulder of the bottle, the automatic dispensing of the prefilled volume of liquid is underway from the plant watering and/or feeding unit, thereby watering each plant when needed.

DRAWINGS OF THE PREFERRED EMBODIMENT

A preferred embodiment of the plant watering and/or feeding unit for automatically dispensing its prefilled volume of liquid, as periodically needed, to a container bound plant is illustrated in the drawings, wherein.

Figure 6:
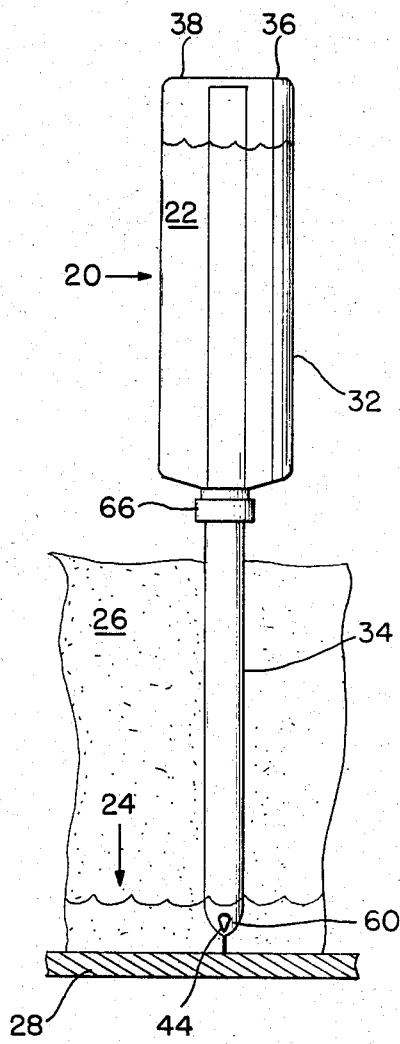
FIG. 6 is a schematic side elevational view indicating the water level is high enough in the soil in the flower pot to create a water seal about the vent of the sensor tube, whereby the vacuum negative pressure is created in the bottle, and no liquid is dripping from the orifice of the plant watering and/or feeding unit.
Figure 7:
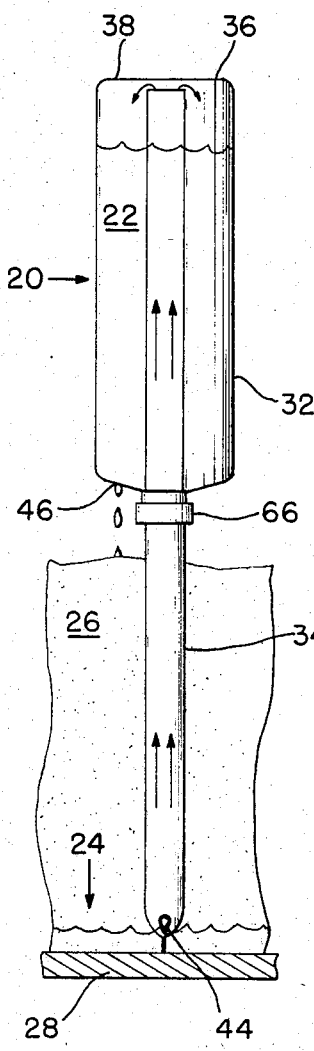
FIG. 7 is a schematic side elevational view similar to FIG. 6, indicating the water level has dropped, thereby clearing the vent of the sensor tube, and the air flow through the soil, up the tube and into the bottle overcomes the vacuum holding power, so the liquid is discharged again through the orifice of the plant watering and/or feeding unit.
Figure 8:
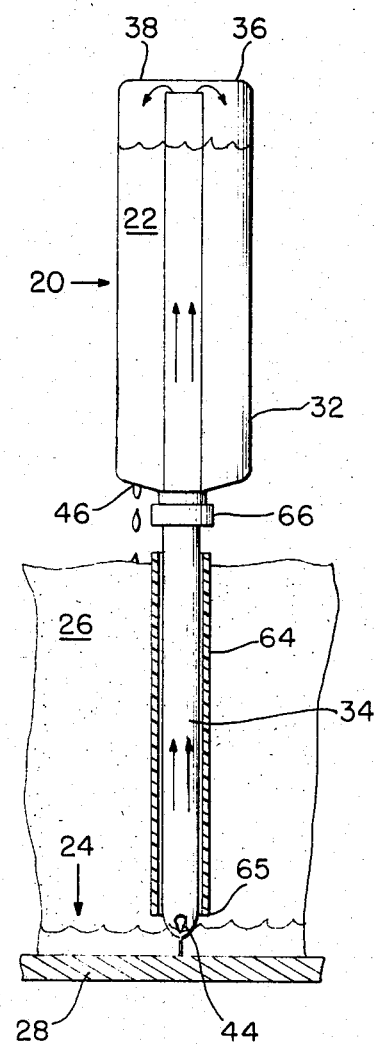
Figure 9:
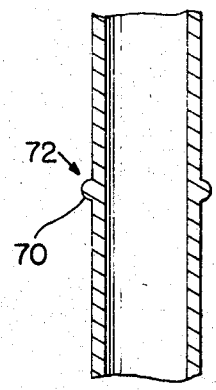
Figure 10:
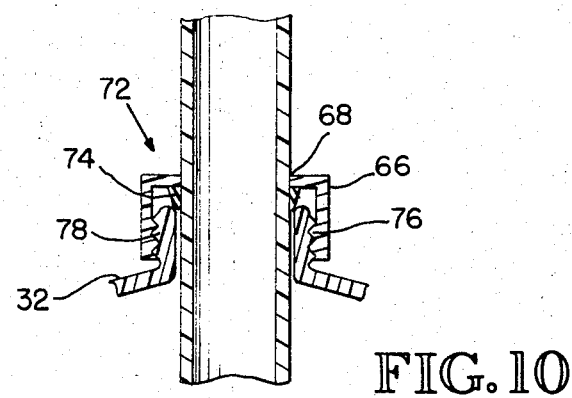

FIG. 8 is a schematic side elevational view similar to FIGS. 6 and 7, indicating how a positioning and supporting tube is used initially for placement in the soil of a flower pot, and thereafter the sensor tube is directed down through it when the plant watering and/or feeding unit is positioned in its effective operating position, thereby making subsequent removals and installations more convenient of only the plant watering and/or feeding unit;

FIG. 9 is an enlarged partial view of how the sensor tube is embossed to serve in the sealing of the sensor tube, cap, and entry of the bottle; and FIG. 10 is an enlarged partial view of how a seal ring of low density plastic is used in sealing the sensor tube, cap, and entry of the bottle of the plant watering and/or feeding unit.

DESCRIPTION OF THE PREFERRED EMBODIMENT

Figure 1:
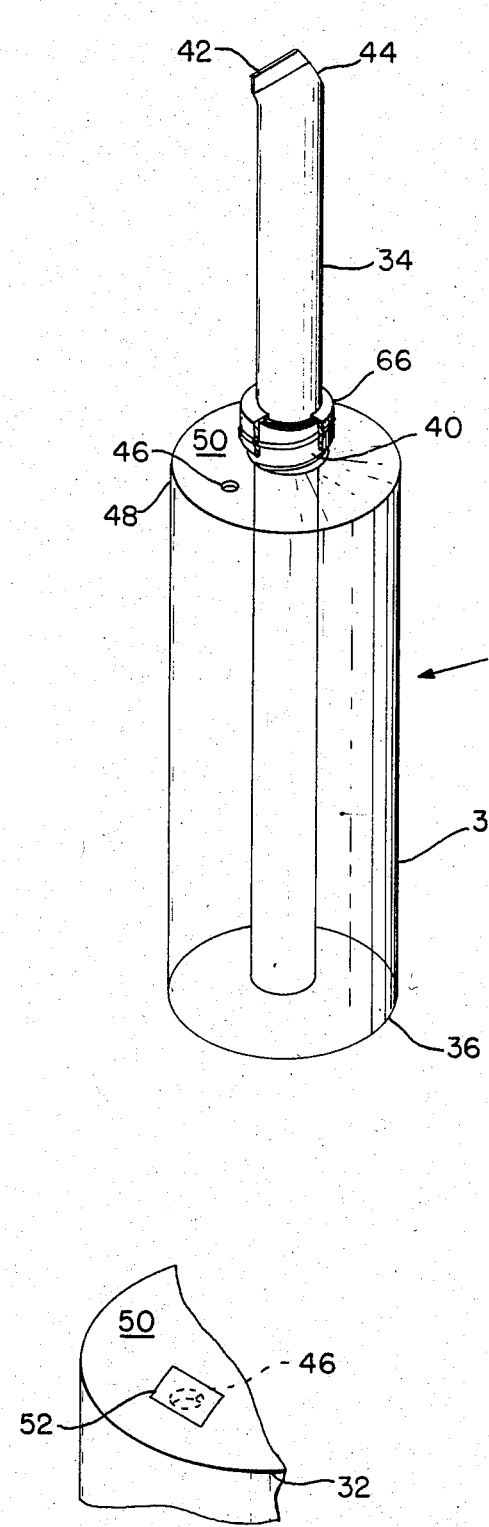
FIG. 1 is a perspective view of the plant watering and/or feeding unit assembled and ready for use.
Figure 2:
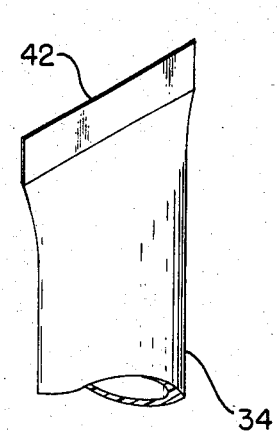
FIG. 2 is an enlarged perspective view of the heat sealed end of the sensor tube before a vent is formed.

The preferred embodiment 20, of the plant watering and/or feeding unit 20, for automatically dispensing its prefilled volume of liquid 22, as periodically needed and signalled by the liquid level 24, in the soil 26 in a flower pot 28 or other container 28 holding one or more growing plants 30, as illustrated in FIGS. 1 and 2, is assembled from low cost, available, conventional components. The receptacle 32, for the liquid 22 is a plastic bottle 32 preferably available in three sizes: an eight ounce, ten inch high size; a sixteen ounce, thirteen inch high size; and a thirty-two ounce, seventeen inch high size.

The respective sized sensor tubes 34 extend within one-sixteenth of an inch to the original bottom 36 of the bottle, which becomes the top 38 of the unit 20 when positioned for active dispensing of the liquid 22, and beyond the entry 40 of the bottle 32 a distance substantially matching the distance of its portions centrally positioned inside the bottle 32. These sensor tubes 34 are derived from conventional, available, low cost plastic tubes having a one-half inch inside diameter and a five-eighths inch outside diameter.

Figure 3:
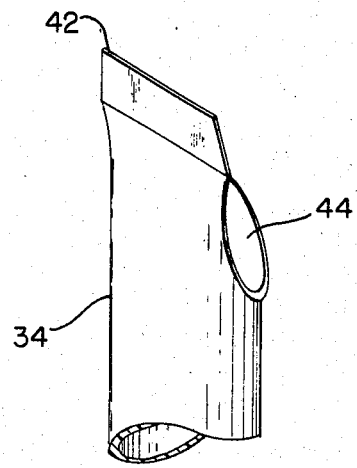
FIG. 3 is an enlarged partial perspective view of the bias cut sealed end of the sensor tube after the vent is thereby formed.

As shown in FIG. 2, the eventual low inserted end 42 of the sensor tube 34, is originally heat sealed. It will so remain for a while, when the plant watering and/or feeding unit 20 is originally sold while containing a nutrient liquid. The purchaser just before inserting the heat sealed lower end 42 will cut it on a thirty degree bias, commencing three-quarters of an inch from its terminus, to create a vent 44, as shown in FIG. 3. This cut commences at the midpoint of the heat seal. The suggested thirty degree bias is, however, in a satisfactory range, in respect to a horizontal reference, of twenty to eighty degrees, and in respect to a vertical reference of thirty to seventy degrees.

Figure 4:
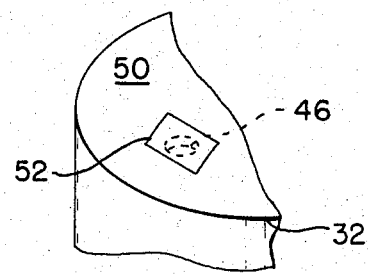
FIG. 4 is an enlarged partial perspective view of the placement of a sealing tape over the orifice of bottle shoulder portion, when a plant watering and/or feeding unit is marketed when it contains a feeding liquid.

As shown in FIGS. 1 and 4, an orifice 46 is formed by creating a hole 46, midway between the entry 40 of the bottle 32 and its wall 48, in its shoulder 50. When the plant watering and/or feeding unit 20 is sold filled with a nutrient liquid, this orifice 46 is covered with a sealing tape 52.

Figure 5:
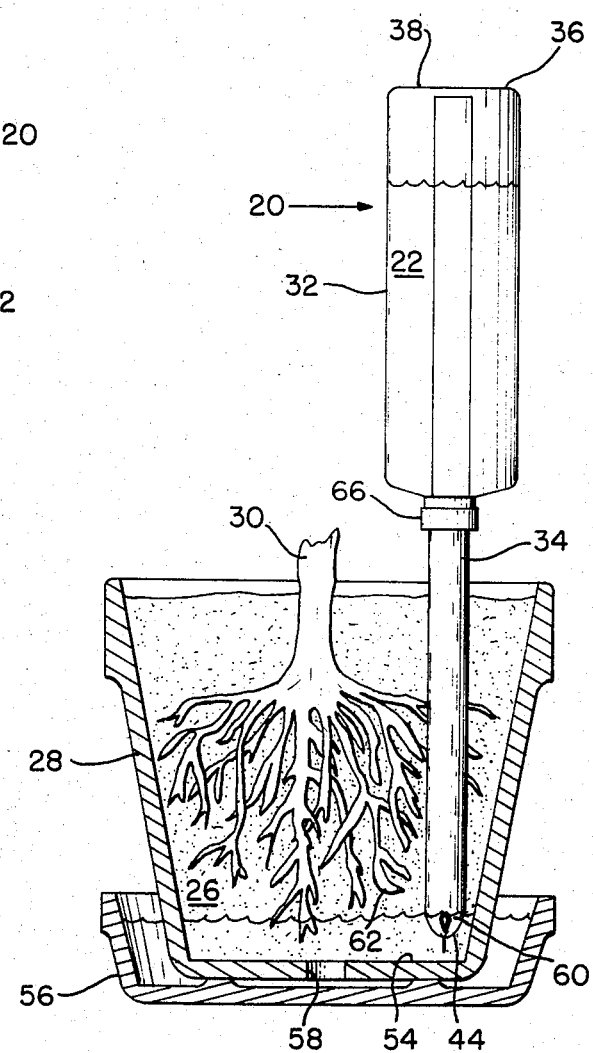
FIG. 5 is a side elevational view with portions removed to illustrate how the plant watering and/or feeding unit is placed adjacent a growing plant in a flower pot.

When the plant watering and/or feeding unit 20 is ready for use, after cutting to create the vent 44 and removing the sealing tape 52, while it is positioned in the normal upright position of a bottle 32, it is then quickly inverted and its sensor tube 34 is moved down into the soil 26 with its sides being compressed by the soil, so very little soil enters tube 34, to contact the bottom 54 of the flower pot 28, as shown in FIG. 5. The flower pot 28 may be of any type and, if it has a centered bottom drain hole 58, it may have an underlying water and moisture collecting tray 56, to collect drainage passing through the drain hole 58.

The cycling of the water and/or liquid feeding of a growing plant 30 is schematically illustrated in FIGS. 6 and 7. In FIG. 6, as also shown in FIG. 5, the water or liquid level 24 in the soil 26 within the flower pot 28 is high enough to create a water or liquid seal 60 about the vent 44 on the then lower end of the sensor tube 34. Therefore, no air is able to pass through the soil 26, up through the sensor tube 34 and beyond into the bottle 32 at the top 38 of the plant watering and/or feeding unit 20. As long as the liquid or water seal 60 remains, there is sufficient liquid available to the roots 62 of the plant 30. However, as illustrated in FIGS. 7 and 8, when the water level drops below the vent 44 on the sensor tube 34, no longer is there a seal 60, and air flows through the soil 26, up the sensor tube 34 and into the bottle 32, i.e. the receptacle 32. With the vacuum then overcome, the liquid 22 departs from the bottle 32, via orifice 46, to again water and/or feed the plant 30, until liquid level 24 rises sufficiently to once again create the liquid seal 60 about the vent 44. This cycling, shown in FIGS. 5, 6, 7 and 8, continues until the liquid 22 is fully drained out through the orifice 46 in the bottle 32.

The preferred diameter of the orifice 46 is one-eighth of an inch in diameter. By keeping the diameter of the orifice 46 at one-eighth of an inch, sufficient liquid discharge flow is undertaken. Yet an equilibrium will be reached during the course of the discharge of liquid, when the downward pull of liquid gravity is exactly balanced by the upward pull of the vacuum. Then at this time of this equilibrium no further liquid will be discharged through orifice 46. As illustrated in the drawings, the discharging of the liquid through the overhead orifice 46 is preferred for better distribution of the liquid into the soil 26, and also so there will be no combining of the flow of the liquid with the flow of the venting air in the sensor tube 34.

In FIG. 8, the use of a positioning and/or support tube 64 is shown. It is made of plastic tubing having a one inch outside diameter and a seven-eighths inch inside diameter. This tube 64 is pre-positioned with the soil 26 in a flower pot 28 to provide a passageway to repeatedly insert and remove the plant watering and/or feeding unit 20. It is positioned with its lower end 65 about one-quarter of an inch above the bottom 54 of the flower pot 28.

The complete sealing between the entry 40 of the bottle 32, the cap 66 and its hole 68, and the sensor tube 34, may be undertaken in several ways. In FIG. 9, the sensor tube 34 is illustrated having an external boss 70 which cooperates to contact all these respective portions to create the overall multiply effective seal at this location 72. In FIG. 10, instead of using such an external boss 70, a low density plastic seal ring 74 is used to create the overall multiply effective seal at this location 72. The cap internal threads 76, or equivalent interfitting structure, and the external threads 78 of the entry 32 of the bottle 32, or equivalent interfitting structure, are selectable from several commercially available cap and bottle configurations.

As assembled, filled with nutrient liquid 22 and sealed, this plant watering and/or feeding unit 20 is ready for shipment, then placement on store shelves with the bottle 32 in its conventionally upright position, to be selected and purchased by a customer. Then the user at the place of locale of a growing plant 30, cuts the vent 44, removes the sealing tape 52, and with or without using a support and positioning tube 64, inverts the plant watering and/or feeding unit 20 and lowers the sensor tube 34 until the vent 44 is positioned at and near by the bottom 54 of the receptacle 28, or flower pot 28. After the liquid is fully or substantially discharged via multiple cycles, the bottle of plant watering and/or feeding unit may be refilled with water and/or nutrient liquids and continued in use to supply liquids to the plant or plants on their demand. The capacity of the bottles permit the users, not to be homebound, in their adequate care of these plants. Also the guessing of when a plant needs water is eliminated. Moreover, when friends are helping during extended vacation times, the visits of friends to water plants are less frequent and more conveniently undertaken without the worry of possibly, otherwise, either overwatering a plant or having the plant suffer from a dry spell.

This is all accomplished by employing these plant watering and/or feeding units 20, which are simpler in their overall assembly and operation, and comparatively lower in cost, than those products previously offered, centering on utilization of the same principle, briefly referred to now as the vacuum pressure release principle. The water and/or nutrient liquid is supplied on the demand of the growing plant 20, centering on the rise and fall of the liquid level 24 in the flower pot 28, in turn creating and eliminating the liquid seal 60 and vacuum negative pressures.

We claim:
1. A plant feeding unit to supply liquid to growing plants in containers on their demand, as sensed in accordance with a liquid table in soil of a container, comprising:
 (a) a receptacle for liquid said receptacle being formed from a plastic bottle, said receptacle to be positioned upside down when initially substantially filled with liquid and thereafter used as a source of liquid, said receptacle having an entry which in turn has interfitting structure, and having an orifice fr liquid flow formed in a shoulder of the receptacle midway between the entry and an outer wall, with the orifice having a one eighth of an inch diameter allowing a sufficient liquid discharge flow yet an equilibrium to be reached during the course of the discharge of liquid when the downward pull of liquid gravity is exactly balanced by the upward pull of vacuum in said receptacle which is created after the liquid table in the soil rises high enough to seal off a near bottom vent in a sensor tube;
 (b) a sensor tube for guiding an airflow, formed from a plastic tube having an overall length twice the depth of the receptacle, a top circular open end inserted upwardly into the receptacle until said top circular open end is slightly spaced from the invented bottom of the bottle, and having a bottom heat sealed end, which is thereafter selectively cut on a bias in an angular range of between twenty and eighty degrees from the horizontal bottom of the bottom heat sealed end leaving at least one half of the width of the bottom of the sensor tube uncut, said cut opening providing a narrow non soil clogging vent for air with the uncut portion of the bottom heat sealed end providing the means to space the narrow non soil clogging vent for air above the bottom of the plant container;
 (c) a cap, having a central hole to receive the sensor tube and having interfitting structure for securement to the interfitting structure of the entry of the receptacle; and
 (d) a seal to create a multiple effective seal between the sensor tube, receptacle, and cap.

* * * * *